Figure 1:
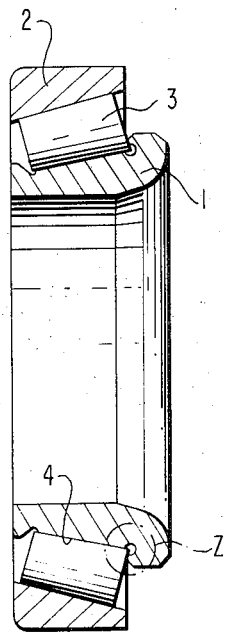

United States Patent [19]

Trachte et al.

[11] 3,820,865

[45] June 28, 1974

[54] CONICAL ROLLER BEARING FOR WHEEL BEARINGS

[75] Inventors: Kurt Trachte, Echterdingen; Hans J. Brummer, Rommelshausen, both of Germany

[73] Assignee: Daimler-Benz Aktiengesellschaft, Stuttgart, Germany

[22] Filed: Apr. 20, 1973

[21] Appl. No.: 352,991

[30] Foreign Application Priority Data
Apr. 20, 1972 Germany.......................... 2219327

[52] U.S. Cl. .............................................. 308/214
[51] Int. Cl. .......................................... F16c 19/00
[58] Field of Search.................... 308/214, 212, 213

[56] References Cited
UNITED STATES PATENTS
2,071,628   2/1937   Hedgcock .......................... 308/214

*Primary Examiner*—Charles J. Myhre
*Assistant Examiner*—Frank Susko
*Attorney, Agent, or Firm*—Craig and Antonelli

[57] ABSTRACT

A conical roller bearing for wheel bearings of motor vehicles which includes an outer race and an inner race and bearing rollers of essentially truncated conical shape; an annular gap is thereby formed between the bearing surface of the inner race and a circular ring placed radially inwardly against the bearing roller; with a length of about 3 to 4 mm., the gap has a maximum radial thickness of about 40/1000 to about 60/1000 of a millimeter whereby the length of the conical ring gap to the overall length of the bearing surface is at the ratio of about 1:3 to about 1:5.

8 Claims, 2 Drawing Figures

PATENTED JUN 28 1974 3,820,865

CONICAL ROLLER BEARING FOR WHEEL BEARINGS

The present invention relates to a conical roller bearing for wheel bearings of motor vehicles with an outer race and an inner race, whose bearing surface or raceway is disposed essentially on a cone-shaped surface, and with essentially conically truncated bearing rollers, in which in the intended position of the outer and inner race, a conical ring gap which tapers in the direction toward the cone apex, is produced at the raceway or bearing surface end disposed opposite the cone end between the raceway or bearing surface of the inner race and a circular ring placed radially inwardly against the bearing rollers.

The present invention is concerned with the task to so construct a conical roller bearing of this type that it is able to withstand also the loads and stresses occurring under extreme conditions especially in heavy and fast passenger motor vehicles and still possesses normal lengths of life even under these extreme conditions. In particular, the task underlying the present invention resides in so further developing a conical roller bearing for motor vehicles that the conical roller bearing also is able to withstand the tilting of the outer race or ring with respect to the inner race or ring which occurs in the operation, and still possesses the necessary bearing strength and bearing capacity also in such extreme cases.

This is achieved according to the present invention in that the conical ring gap achieved by the reduction of the bearing surface diameter of the inner race at the end opposite the cone tip has a maximum radial thickness of about 40 thousandths to 60 thousandths of a millimeter, preferably about 50 thousandths of a millimeter, with a length of about 3–4 millimeters and in that the length of the conical ring gap to the overall length of the bearing surface is at the ratio of about 1 : 3 to about 1 : 5, preferably about 1 : 4.

A conical roller bearing with two raceway or bearing surfaces disposed at an angle to one another is produced by the construction according to the present invention, of which the former, wider bearing surface represents that annular surface on which roll off the rollers under a bearing load acting in a radial direction. With forces acting transversely thereto, i.e., especially with eccentrically axially engaging forces which have as a consequence a tilting of the outer bearing race with respect to the inner bearing race, the roller, in contradistinction thereto, runs off essentially on the second annular surface formed by the conical ring gap. Consequently, from an overall point of view, a conical roller bearing which heretofore could not be adjusted in relation to the axial position of outer race and inner race is converted by this invention into an adjustable, conical roller bearing which, in contrast to the known, prior art conical roller bearings, is insensitive against alignment errors between the axes of the inner and outer races resulting from extreme loads occurring in the operation since the two annular surfaces form bearing zones disposed at an angle to one another. The differently large width of the bearing zones takes into consideration the fact that the extreme loads which have as a consequence the tilting of inner and outer race with respect to one another, occur more rarely in comparison to the normal loads.

The proposal according to the present invention to provide a conical roller bearing whose inner race, with a regular truncated coneshape of the rollers, includes two annular surfaces disposed at an angle with respect to each other as bearing zones for different load conditions, differs in principle from the prior art proposals, in which for the prevention of chipping or breaking-off, material removals were undertaken within the area of the end zones of the bearing surfaces or of the rollers. More specifically, these material removals were, in practice, no more than a bevelling or chamfering of the conical rollers within the area of their end faces, i.e., a breaking of the edges of the conical bearing rollers or a cut-back of the bearing surface of inner or outer race over a very small width, i.e., with bearings of comparable size to a width of less than 1 mm. In particular, these bevellings or chamferings served exclusively the purpose to reduce peak stresses which occur at the ends by reason of the elastic deformation of bearing rollers and bearing races, and thus to attain an essentially uniform stress distribution for the entire length of the rollers.

The problem underlying the present invention, however, resides as already indicated hereinabove, to counteract the extreme loads temporarily occuring in operation and the alternate deformations of wheel pin and wheel hub conditioned by these loads which have as a consequence changes in the axial position of the bearing races to one another, and this problem cannot be solved by means of a mere bevelling or chamfering at the bearing ends. The solution of this problem with which the present invention concerns itself, instead resides in the subdivision of the inner race into two annular surfaces disposed at an angle to one another which are coordinated essentially to different load conditions and which are not concerned with the task of a uniform stress distribution, which is uniform in operation over the entire bearing surface width.

Accordingly, it is an object of the present invention to provide a conical roller bearing for wheel bearings of motor vehicles which avoids by simple means the aforementioned shortcomings and drawbacks encountered in the prior art.

Another object of the present invention resides in a conical roller bearing for the wheel bearings of motor vehicles which is able to withstand completely satisfactorily the loads and stresses occurring under extreme conditions without sacrifice in the normal life length of such bearings.

A further object of the present invention resides in a conical roller bearing of the type described above which is able to withstand tilting of the outer race with respect to the inner race without damage to the bearing.

A still further object of the present invention resides in a conical roller bearing which has effectively adjustable characteristics as regards the axial position of the outer and inner races, and thus is able to absorb both radial and axial loads of considerable magnitudes.

Figure 2:
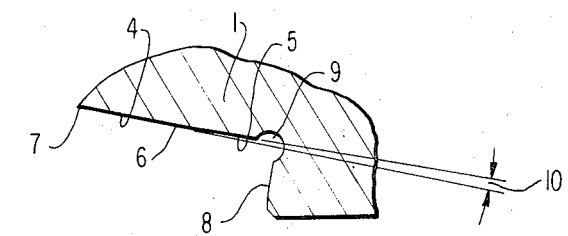

These and further objects, features and advantages of the present invention will become more apparent from the following description when taken in connection with the accompanying drawing which shows, for purposes of illustration only, one embodiment in accordance with the present invention, and wherein:

FIG. 1 is a schematic axial cross-sectional view through a conical roller bearing according to the present invention; and FIG. 2 is a schematic partial cross-sectional view, on an enlarged scale, illustrating the details encircled by the circle Z in FIG. 1.

Referring now to the drawing wherein like reference numerals are used throughout the two views to designate like parts, the conical roller bearing illustrated in FIG. 1 includes an inner ring or race 1, an outer ring or race 2 and bearing rollers 3. The bearing rollers 3 are constructed as truncated cones. The contact angle of the illustrated conical roller bearing amounts to about 15°.

As can be seen from FIG. 1 in conjunction with FIG. 2, the raceway or bearing surface 4 of the inner race 1 is disposed essentially on an annular cone-shaped surface. With respect to this annular cone-shaped surface, the bearing surface 4 is constructed relief-ground only within the area of its end opposite the cone apex. Within the relief ground area the bearing surface 4 is designated by reference numeral 5. The relief-ground portion 5 of the bearing surface 4 forms an annular surface which, in the illustrated embodiment, passes over by way of a rounded off transition 6 into that portion of the bearing surface 4 which forms as annular surface a disc of a conical shell. This annular surface is designated by reference numeral 7. A groove or fillet 9 is provided in the usual manner in the transition from the annular surface 5 forming the relief-ground portion into the abutment shoulder 8.

A conical ring gap 10 results from the relief-ground portion of the bearing surface 4 in the end area thereof opposite the cone apex which conical ring gap is delimited, on the one hand, by the annular surface 5 and, on the other, by a circular ring placed radially inwardly against the bearing rollers 3, which is not illustrated herein but in practice corresponds to a disk of the conical shell containing the annular surface 7. The conical ring gap 10 has at its end opposite the cone apex, i.e., adjacent the transition of the annular surface 5 into the groove or fillet 9, a thickness of about 40 thousandths to about 60 thousandths of a millimeter, preferably of about 50 thousandths of a millimeter in accordance with the present invention. The length of the annular surface 5, as measured from the shoulder 8, amounts in the bearing of the illustrated embodiment, which includes rollers 3 with a length of about 12.5 mm., about 3 to about 4 millimeters.

The bearing surface 4 is constructed rectilinearly within the area of the annular surface 5. However, within the scope of the present invention it can, of course, also be constructed crowned or curved.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A conical roller bearing for wheel bearings of motor vehicles which includes an outer race means and an inner race means, whose bearing surface is disposed essentially on a conical shell, and bearing roller means of essentially conically truncated shape, in which in the intended position of outer and inner race means, a conical ring gap results between the bearing surface of the inner race means and a circular ring placed radially inwardly against the bearing roller means at the bearing surface end opposite the cone apex, and said conical ring gap tapering in the direction toward the cone apex, characterized in that the conical ring gap achieved by a reduction of the bearing surface diameter of the inner race means at the end opposite the cone apex, with a length of about 3 to 4 mm. thereof, has a maximum radial thickness of about 40/1000 to about 60/1000 of a millimeter, and in that the length of the conical ring gap to the entire length of the bearing surface is in the ratio of about 1 : 3 to about 1 : 5.

2. A conical roller bearing according to claim 1, characterized in that the maximum radial thickness is about 50/1000 of a millimeter.

3. A conical roller bearing according to claim 2, characterized in that said ratio is about 1 : 4.

4. A conical roller bearing according to claim 3, characterized in that two annular surfaces are formed by the conical ring gap, the first annular surface being relatively longer and the second annular surface which is disposed angularly to the first annular surface, being constructed crowned.

5. A conical roller bearing according to claim 4, characterized in that the crown construction is formed by a curved surface portion which serves as generatrix for the second annular surface.

6. A conical roller bearing according to claim 1, characterized in that said ratio is about 1 : 4.

7. A conical roller bearing according to claim 1, characterized in that two annular surfaces are formed by the conical ring gap, the first annular surface being relatively longer and the second annular surface which is disposed angularly to the first annular surface, being constructed crowned.

8. A conical roller bearing according to claim 7, characterized in that the crown construction is formed by a curved surface portion which serves as generatrix for the second annular surface.

* * * * *